US012000850B2

(12) United States Patent
Schmitt

(10) Patent No.: US 12,000,850 B2
(45) Date of Patent: Jun. 4, 2024

(54) LABORATORY SAMPLE DISTRIBUTION SYSTEM AND CORRESPONDING METHOD OF OPERATION

(71) Applicant: Roche Diagnostics Operations, Inc., Indianapolis, IN (US)

(72) Inventor: Norbert Schmitt, Lucerne (CH)

(73) Assignee: ROCHE DIAGNOSTICS OPERATIONS, INC., Indianapolis, IN (US)

(*) Notice: Subject to any disclaimer, the term of this patent is extended or adjusted under 35 U.S.C. 154(b) by 342 days.

(21) Appl. No.: 17/303,609

(22) Filed: Jun. 3, 2021

(65) Prior Publication Data

US 2021/0396775 A1  Dec. 23, 2021

(30) Foreign Application Priority Data

Jun. 19, 2020  (EP) .................................. 20181103

(51) Int. Cl.
*G01N 35/04* (2006.01)
*G01N 35/00* (2006.01)

(52) U.S. Cl.
CPC ....... *G01N 35/04* (2013.01); *G01N 35/00732* (2013.01); *G01N 2035/00851* (2013.01); (Continued)

(58) Field of Classification Search
CPC ............. G01N 35/04; G01N 35/00732; G01N 2035/00851; G01N 2035/0477; G01N 2035/0491; G01N 2035/0401; G06F 3/041; G06F 3/046; G06F 3/0446; B65G 2201/0261; B65G 54/02
See application file for complete search history.

(56) References Cited

U.S. PATENT DOCUMENTS 3,273,727 A  9/1966  Rogers et al.
3,653,485 A  4/1972  Donlon
(Continued)

FOREIGN PATENT DOCUMENTS

CN  201045617 Y  4/2008
CN  102109530 A  6/2011
(Continued)

*Primary Examiner* — Jill A Warden
*Assistant Examiner* — John McGuirk
(74) *Attorney, Agent, or Firm* — Woodard, Emhardt, Henry, Reeves & Wagner, LLP

(57) ABSTRACT

A laboratory sample distribution system with a number of sample container carriers, each comprising at least one magnetically active device and adapted to carry a sample container; a transport plane adapted to support the carriers; a number of electro-magnetic actuators stationary arranged below the transport plane and adapted to move a corresponding carrier located on top of the transport plane by applying a magnetic force to the carrier; a touch panel arranged below the transport plane adapted to generate position signals (PS) depending on positions of the carriers located on top of the transport plane; a position determination unit adapted to determine the positions of the carriers located on top of the transport plane in response to the position signals (PS); and a control unit adapted to control the operation of the laboratory sample distribution system in response to the determined positions of the carriers.

10 Claims, 2 Drawing Sheets

(52) U.S. Cl.
CPC .............. *G01N 2035/0477* (2013.01); *G01N 2035/0491* (2013.01)

(56) References Cited

U.S. PATENT DOCUMENTS

| | | | |
|---|---|---|---|
| 3,901,656 A | 8/1975 | Durkos et al. |
| 4,150,666 A | 4/1979 | Brush |
| 4,395,164 A | 7/1983 | Beltrop et al. |
| 4,544,068 A | 10/1985 | Cohen |
| 4,771,237 A | 9/1988 | Daley |
| 5,120,506 A | 6/1992 | Saito et al. |
| 5,295,570 A | 3/1994 | Grecksch et al. |
| 5,309,049 A | 5/1994 | Kawada et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mori et al. |
| 5,651,941 A | 7/1997 | Stark et al. |
| 5,720,377 A | 2/1998 | Apeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Garashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,211,543 B2 | 12/2015 | Ohga et al. |
| 9,239,335 B2 | 1/2016 | Heise et al. |
| 9,423,410 B2 | 8/2016 | Buehr |
| 9,423,411 B2 | 8/2016 | Riether |
| 9,567,167 B2 | 2/2017 | Sinz |
| 9,575,086 B2 | 2/2017 | Heise et al. |
| 9,593,970 B2 | 3/2017 | Sinz |
| 9,618,525 B2 | 4/2017 | Malinowski et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 9,902,572 B2 | 2/2018 | Mahmudimanesh et al. |
| 9,939,455 B2 | 4/2018 | Schneider et al. |
| 9,952,242 B2 | 4/2018 | Riether |
| 9,969,570 B2 | 5/2018 | Heise et al. |
| 9,989,547 B2 | 6/2018 | Pedain |
| 10,006,927 B2 | 6/2018 | Sinz et al. |
| 10,012,666 B2 | 7/2018 | Riether |
| 10,031,150 B2 | 7/2018 | Heise et al. |
| 10,094,843 B2 | 10/2018 | Malinowski et al. |
| 10,119,982 B2 | 11/2018 | Baer |
| 10,126,317 B2 | 11/2018 | Heise et al. |
| 10,160,609 B2 | 12/2018 | Malinowski |
| 10,175,259 B2 | 1/2019 | Riether |
| 10,197,586 B2 | 2/2019 | Sinz et al. |
| 10,239,708 B2 | 3/2019 | Sinz |
| 10,261,103 B2 | 4/2019 | Pedain |
| 10,288,634 B2 | 5/2019 | Kaeppeli |
| 10,352,953 B2 | 7/2019 | Huber et al. |
| 10,416,183 B2 | 9/2019 | Hassan |
| 10,450,151 B2 | 10/2019 | Heise et al. |
| 10,495,657 B2 | 12/2019 | Malinowski |
| 10,509,049 B2 | 12/2019 | Sinz et al. |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1 | 7/2010 | Bergmann |
| 2010/0186618 A1 | 7/2010 | King et al. |
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0184564 A1* | 7/2014 | Yeh ............... G06F 3/0446 345/174 |
| 2014/0231217 A1* | 8/2014 | Denninger ....... G01N 35/00584 198/619 |
| 2014/0234949 A1 | 8/2014 | Nasson et al. |
| 2015/0014125 A1 | 1/2015 | Hecht |
| 2015/0140668 A1 | 5/2015 | Mellars et al. |

(56) References Cited

U.S. PATENT DOCUMENTS

| | | |
|---|---|---|
| 2015/0166265 A1 | 6/2015 | Pollack et al. |
| 2015/0241457 A1 | 8/2015 | Miller |
| 2015/0273468 A1 | 10/2015 | Croquette et al. |
| 2015/0273691 A1 | 10/2015 | Pollack |
| 2015/0276775 A1 | 10/2015 | Mellars et al. |
| 2015/0276781 A1 | 10/2015 | Riether et al. |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0087693 A1* | 3/2016 | Shimomura ............ A63F 13/95 340/10.1 |
| 2016/0229565 A1 | 8/2016 | Margner |
| 2017/0108522 A1 | 4/2017 | Baer |
| 2017/0131310 A1 | 5/2017 | Volz et al. |
| 2017/0168079 A1 | 6/2017 | Sinz |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1 | 3/2018 | Mahmudimanesh et al. |
| 2018/0106821 A1 | 4/2018 | Vollenweider et al. |
| 2018/0107300 A1* | 4/2018 | Lin .................. G02F 1/133514 |
| 2018/0128848 A1 | 5/2018 | Schneider et al. |
| 2018/0188280 A1 | 7/2018 | Malinowski |
| 2018/0210000 A1 | 7/2018 | van Mierlo |
| 2018/0210001 A1 | 7/2018 | Reza |
| 2018/0224476 A1 | 8/2018 | Birrer et al. |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0076845 A1 | 3/2019 | Huber et al. |
| 2019/0076846 A1 | 3/2019 | Durco et al. |
| 2019/0086433 A1 | 3/2019 | Hermann et al. |
| 2019/0094251 A1 | 3/2019 | Malinowski |
| 2019/0094252 A1 | 3/2019 | Waser et al. |
| 2019/0101468 A1 | 4/2019 | Haldar |
| 2019/0285660 A1 | 9/2019 | Kopp et al. |
| 2020/0200783 A1 | 6/2020 | Durco |
| 2020/0400698 A1 | 12/2020 | Tafner et al. |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| EP | 3001288 A1 | 3/2016 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-033424 A | 2/2009 |
| JP | 2009-036643 A | 2/2009 |
| JP | 2009033424 A * | 2/2009 ........... G06K 7/0008 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2011-086103 A | 4/2011 |
| JP | 2013-172009 A | 2/2013 |
| JP | 2013-190400 A | 9/2013 |
| SU | 685591 A1 | 9/1979 |
| WO | 1996/036437 A1 | 11/1996 |
| WO | 2003/042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2012/158520 A1 | 11/2012 |
| WO | 2012/158541 A1 | 11/2012 |
| WO | 2013/064656 A1 | 5/2013 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

* cited by examiner

LABORATORY SAMPLE DISTRIBUTION SYSTEM AND CORRESPONDING METHOD OF OPERATION

CROSS-REFERENCE TO RELATED APPLICATIONS

This application claims priority to European Patent Application No. EP 20181103.1, filed 19 Jun. 2020, the disclosure of which is hereby incorporated by reference in its entirety.

TECHNICAL FIELD

The disclosure relates to a laboratory sample distribution system and a corresponding method of operation.

BACKGROUND

A laboratory sample distribution system is, e.g., disclosed in document WO 2013/064656 A1. Such a laboratory sample distribution system provides for a high throughput and for reliable operation. The laboratory sample distribution system comprises a number of sample container carriers, said sample container carriers each comprising at least one magnetically active device and being adapted to carry a sample container, a transport plane being adapted to support said sample container carriers, a number of electro-magnetic actuators being stationarily arranged below said transport plane, said electro-magnetic actuators being adapted to move a corresponding sample container carrier located on top of said transport plane by applying a magnetic force to said sample container carrier, and multiple IR based reflection light barriers being adapted to sense the presence and/or position of container carriers located on the transport plane.

SUMMARY

Although the embodiments of the present disclosure are not limited to specific advantages or functionality, the disclosure provides for a laboratory sample distribution system and a corresponding method of operation enabling an efficient, reliable and cost effective determining of positions of sample container carriers located on top of the transport plane.

In accordance with one embodiment of the present disclosure, a laboratory sample distribution system is provided, the laboratory sample distribution system comprising: a number of sample container carriers, said sample container carriers each comprising at least one magnetically active device and being adapted to carry a sample container; a transport plane being adapted to support said sample container carriers; a number of electro-magnetic actuators being stationarily arranged below said transport plane, said electro-magnetic actuators being adapted to move a corresponding sample container carrier located on top of said transport plane by applying a magnetic force to said sample container carrier; a touch panel arranged below the transport plane being adapted to generate position signals (PS) depending on positions of the sample container carriers located on top of the transport plane; a position determination unit, wherein the position determination unit is adapted to determine the positions of the sample container carriers located on top of the transport plane in response to the position signals (PS), and a control unit being adapted to control the operation of the laboratory sample distribution system in response to the determined positions of the sample container carriers.

In accordance with another embodiment of the present disclosure, a method of operating a laboratory sample distribution system according to an embodiment of the present disclosure is provided, the method comprising the steps: transmitting data to the control unit via the touch panel, wherein the data is selected from the following group of data: a sample container carrier ID of a sample container carrier, a version number of a sample container carrier, information, if a sample container is closed or open, information regarding a type of a sample container, information regarding a type of a sample contained in the sample container, information, if a sample container was removed from a sample container carrier or not, information regarding a charging level of a battery powering the sample container carrier, and information regarding an operating time of a sample container carrier.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
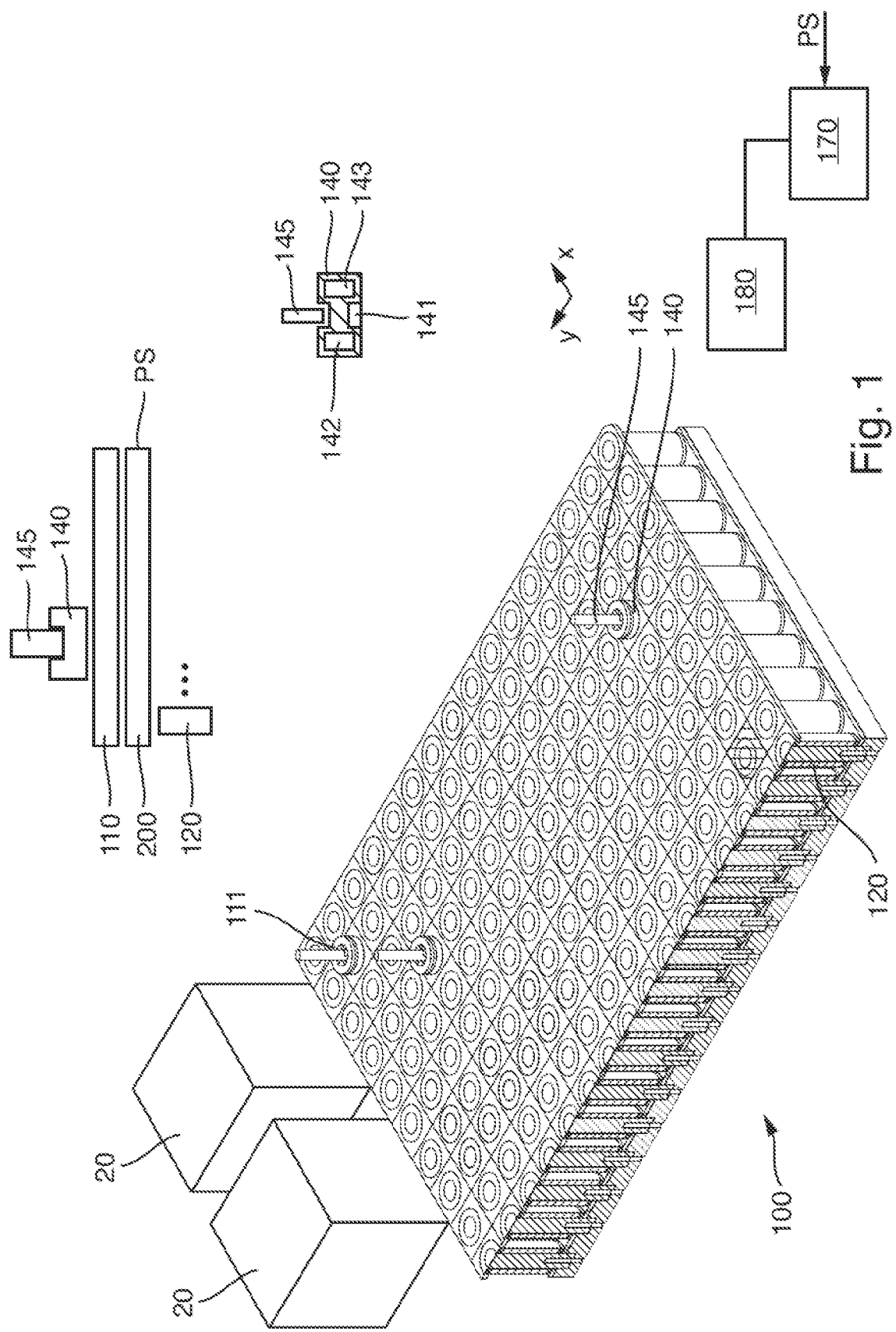
FIG. 1 shows a view of a laboratory sample distribution system according to one embodiment of the present disclosure.

Skilled artisans appreciate that elements in the figures are illustrated for simplicity and clarity and have not necessarily been drawn to scale. For example, dimensions of some of the elements in the figures may be exaggerated relative to other elements to help improve understanding of the embodiment (s) of the present disclosure.

DETAILED DESCRIPTION

The laboratory sample distribution system comprises a number of sample container carriers, e.g., between 1 and 100,000 sample container carriers, said sample container carriers each comprising at least one magnetically active device and being adapted to carry a sample container, a transport plane being adapted to support said sample container carriers, a number, e.g., between 1 and 1024, of electro-magnetic actuators being stationarily arranged below said transport plane in rows and columns, said electro-magnetic actuators being adapted to move a corresponding sample container carrier located on top of said transport plane by applying a magnetic force to said sample container carrier.

The laboratory sample distribution system further comprises a touch panel arranged below the transport plane being adapted to generate position signals depending on respective positions of the sample container carriers located on top of the transport plane.

The laboratory sample distribution system further comprises a position determination unit, e.g., in form of a microprocessor-based device, wherein the position determination unit is adapted to determine the respective positions of the sample container carriers located on top of the transport plane in response to the position signals.

The laboratory sample distribution system further comprises a control unit, e.g., in form of a Personal Computer, being adapted to control the operation of the laboratory sample distribution system in response to the determined positions of the sample container carriers.

The control unit and the position determination unit may be embodied as different units or may be embodied using a common microprocessor based device.

According to an embodiment, the touch panel is embodied as a conventional multi-touch capacitive touch panel. A capacitive touch panel typically comprises an insulator, such as glass, coated with a transparent conductor, such as indium tin oxide (ITO). Touching the surface of the touch panel typically results in a distortion of the touch panel's electrostatic field, measurable as a change in capacitance. Different technologies may be used to determine the positions of the sample container carriers, e.g., surface capacitance, projected capacitance, mutual capacitance, self-capacitance, etc. Reference is also made to the relevant technical literature regarding multi-touch capacitive touch panels. According to the disclosure, this basically well-known technology may also be used to determine the positions of the sample container carriers located on top of the transport plane.

The conventional multi-touch capacitive touch panel may be a conventional so called projected capacitive touch sensor (PCT) that is, e.g., used in smartphones or tablets. A PCT used for smartphones or tablets typically comprises a touch sensor foil and a display. According to the disclosure, only the touch sensor foil is used for position determination. These touch sensor foils can be manufactured in any shape and size and may, e.g., be adhesively mounted under the transport plane.

Since PCT sensors are made for detection of capacitive changes usually either a conductive mass must be provided or a connection to ground. Nevertheless, it has been found that the magnetically active device, e.g., in form of a permanent magnet, of the sample container carrier induces a specific signal pattern in the capacitive touch sensor foil which can be used by the position determination unit to determine the positions of the sample container carriers located on top of the transport plane, i.e., on top of the touch sensor foil.

According to an embodiment, the touch panel is a passive panel being based on electromagnetic induction. Passive touch panels make use of electromagnetic induction, where the horizontal and vertical wires of the touch panel operate as both transmitting and receiving coils. The touch panel generates an electromagnetic or a magnetic signal, which may, e.g., be received by a transmitting device of the sample container carrier. The wires in the touch panel then change to a receiving mode and read the signal generated by the transmitting device. By using (electro-) magnetic signals, the touch panel is able to power the sample container carrier with this signal such that the sample container carriers used with the touch panel do not need batteries. Reference is also made to the relevant technical literature.

According to an embodiment, the induction based passive touch panel comprises a thin, in particular self-adhesive, sensor foil having horizontal conductor paths and vertical conductor paths at different layers of the sensor foil, and a switching electronics connected to the horizontal and vertical conductor paths, wherein the switching electronics is adapted to connect the horizontal and vertical conductor paths such that coils at different locations on the touch panel are formed in a time-multiplex manner, wherein each position signal of the position signals is formed in a corresponding one of the coils.

According to an embodiment, each sample container carrier comprises a data transmitting device being adapted to transmit data to the control unit via the touch panel.

According to an embodiment, the data transmitting device is contactlessly supplied with electrical energy by means of the touch panel.

The method of operating a laboratory sample distribution system as described above comprises the steps: transmitting data to the control unit via the touch panel, wherein the data is selected form the following group of data: a sample container carrier ID of a sample container carrier, a version number of a sample container carrier, information, if a sample container is closed or open, information regarding a type of a sample container, information regarding a type of a sample contained in the sample container, information, if a sample container was removed from a sample container carrier or not, information regarding a charging level of a battery powering the sample container carrier, and information regarding an operating time of a sample container carrier.

According to an embodiment, data to be transmitted are transferred by means of load modulation.

According to an embodiment, it is checked, if a determined position of a sample container carrier corresponds to a predetermined processing position on the transport plane, and if the determined position of a sample container carrier corresponds to the predetermined processing position on the transport plane, initiating a data transmission between the sample container carrier located at the processing position and the control unit, e.g., by generating an alternating magnetic field by means of the touch panel powering the sample container carrier. A predetermined processing position may, e.g., be a position where a pick and place device removes a sample container from a sample container carrier or inserts a sample container into a sample container carrier, etc.

According to an embodiment, electrical energy is contactlessly supplied to the data transmitting device of the sample container carrier located at the processing position by means of the touch panel.

FIG. 1 shows a laboratory sample distribution system 100.

The laboratory sample distribution system 100 comprises sample container carriers 140 being adapted to carry a sample container 145 containing a laboratory sample to be analyzed. The sample container carriers 140 each comprise a magnetically active device in form of a permanent magnet 141.

The laboratory sample distribution system 100 further comprises a flat transport plane or surface 110 being adapted to support or carry said sample container carriers 140.

The laboratory sample distribution system 100 further comprises electro-magnetic actuators 120 being stationarily arranged in rows and columns below said transport plane 110. The electro-magnetic actuators 120 are adapted to move a corresponding sample container carrier 140 located on top of said transport plane 100 by applying a magnetic force to said sample container carrier 140.

The laboratory sample distribution system 100 further comprises a multi-touch-capable touch panel 200 arranged below the transport plane 110 and being adapted to generate position signals PS depending on positions of the sample container carriers 140 located on top of the transport plane 110.

The laboratory sample distribution system 100 further comprises a position determination unit 170, wherein the position determination unit 170 is adapted to determine the positions of the sample container carriers 140 located on top of the transport plane 110 in response to the position signals PS.

The laboratory sample distribution system 100 further comprises a control unit 180 being adapted to control the operation of the laboratory sample distribution system 100 in response to the determined positions of the sample container carriers 140.

The touch panel 200 may be embodied as a multi-touch capacitive touch panel or as a passive touch panel being based on electromagnetic induction or as a combination thereof.

Figure 2:
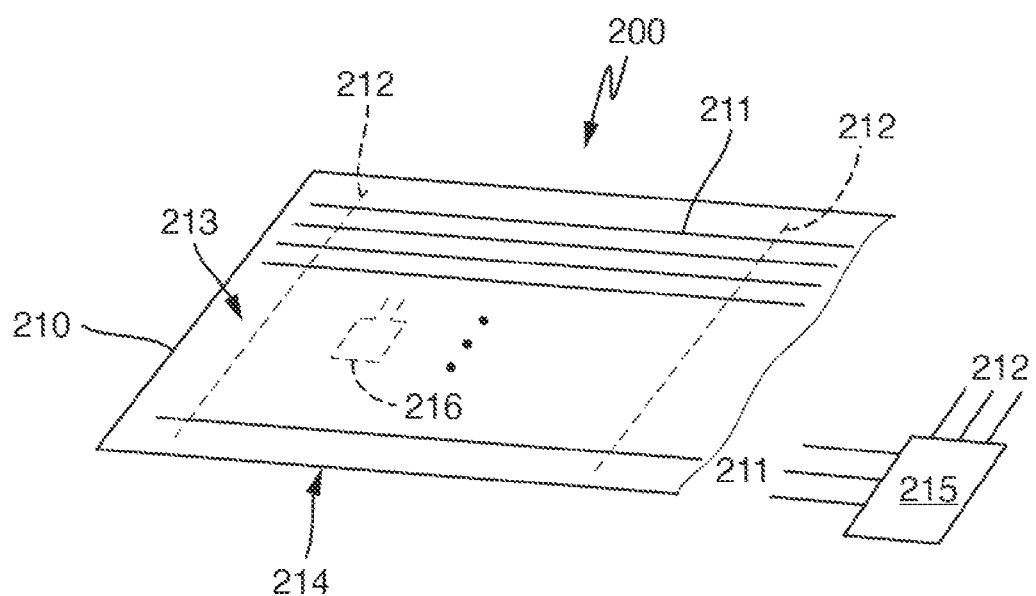
FIG. 2 shows a sensor foil having horizontal conductor paths and vertical conductor paths at different layers of the sensor foil, the sensor foil being part of a touch panel used in the laboratory sample distribution system of FIG. 1.

FIG. 2 shows a sensor foil 210 having horizontal conductor paths 211 and vertical conductor paths 212 at different layers 213, 214 of the sensor foil 210. The sensor foil 210 may be part of the passive touch panel 200 being based on electromagnetic induction used in the laboratory sample distribution system of FIG. 1. The passive touch panel 200 being based on electromagnetic induction may further comprise a switching electronics 215 connected to the horizontal and vertical conductor paths 211, 212, wherein the switching electronics 215 is adapted to connect the horizontal and vertical conductor paths 211, 212 such that coils 216 at different and sensitive locations on the touch panel 200 are formed in a time-multiplex manner, wherein a respective position signal of the position signals PS is formed in a corresponding one of the coils 216.

Again referring to FIG. 1, each sample container carrier 140 comprises a data transmitting device 142 being adapted to transmit data to the control unit 180 via the touch panel 200. The data transmitting device 142 is contactlessly supplied with electrical energy by means of the touch panel 200. In order to supply electrical energy to the data transmitting device 142 an alternating magnetic field may be generated by means of the coils 216 of the touch panel 200, wherein the alternating magnetic field induces an alternating voltage in a receiving coil of the transmitting device 142.

A sample container carrier 140 may communicate data to the control unit 180 via the touch panel 200, e.g., by means of load modulation, as used in and well-known from RFID technology.

The data to be transmitted may, e.g., be selected from the following group of data: a sample container carrier ID of a sample container carrier 140, a version number of a sample container carrier 140, information, if a sample container 145 is closed or open, information regarding a type (geometrical properties/dimensions, material, etc.) of a sample container 145, information regarding a type (blood, urine, etc.) of a sample contained in the sample container 145, information, if a sample container 145 was removed from a sample container carrier 140 or not, information regarding a charging level of a battery powering the sample container carrier 140, and information regarding an operating time of a sample container carrier 140.

The control unit 180 may check, if a determined position of a sample container carrier 140 corresponds to a defined processing position 111 on the transport plane 110. The processing position 111 may, e.g., be a position where processing of the sample container carrier 140, processing of the sample container 145 and/or processing of the sample contained in the sample container 145 may take place. The processing position 111 may, e.g., correspond to a position where a sample container 145 is transferred to a laboratory station 20 such that the sample contained in the sample container 145 may be analyzed by means of the laboratory station 20.

If the determined position of a sample container carrier 140 corresponds to the predetermined processing position 111 on the transport plane 110, a data transmission between the sample container carrier 140 located at the processing position and the control unit 180 may be initiated, e.g., by means of activating a coil 216 located below the processing position 111 to generate an alternating magnetic field contactlessly supplying the data transmitting device 142 with electrical energy such that data can be transmitted to the control unit 180.

What is claimed is:

1. A laboratory sample distribution system, the laboratory sample distribution system comprising:
    a number of sample container carriers, said sample container carriers each comprising at least one magnetically active device and carrying a sample container;
    a transport plane supporting said sample container carriers;
    a number of electro-magnetic actuators being stationarily arranged below said transport plane, said electro-magnetic actuators moving a corresponding sample container carrier located on top of said transport plane by applying a magnetic force to said sample container carrier;
    a touch panel arranged below the transport plane generating position signals (PS) depending on positions of the sample container carriers located on top of the transport plane;
    a position determination unit, wherein the position determination unit determines the positions of the sample container carriers located on top of the transport plane in response to the position signals (PS); and
    a control unit controlling the operation of the laboratory sample distribution system in response to the determined positions of the sample container carriers.

2. The laboratory sample distribution system according to claim 1, wherein the touch panel is a passive panel being based on electromagnetic induction.

3. The laboratory sample distribution system according to claim 2, wherein the touch panel further comprises a sensor foil having horizontal conductor paths and vertical conductor paths at different layers of the sensor foil; and a switching electronics connected to the horizontal and vertical conductor paths, wherein the switching electronics connects the horizontal and vertical conductor paths such that coils at different locations on the touch panel are formed in a time-multiplex manner, wherein each of the position signals (PS) is formed in a corresponding one of the coils.

4. The laboratory sample distribution system according to claim 1, wherein each sample container carrier comprises a data transmitting device transmitting data to the control unit via the touch panel.

5. The laboratory sample distribution system according to claim 2, wherein the data transmitting device is contactlessly supplied with electrical energy by means of the touch panel.

6. The laboratory sample distribution system according to claim 1, wherein the touch panel is a multi-touch capacitive touch panel comprising a touch sensor foil, and
    wherein the position determination unit determines the positions of the sample container carriers located on top of the transport plane using a specific signal pattern in the capacitive touch sensor foil induced by the magnetically active devices of the sample container carriers in the capacitive touch sensor foil.

7. A method of operating a laboratory sample distribution system according to claim 1, the method comprising the steps:
  transmitting data to the control unit via the touch panel, wherein the data is selected from the following group of data:
    a sample container carrier ID of a sample container carrier of the number of sample container carriers,
    a version number of a sample container carrier of the number of sample container carriers,
    information, if a sample container of a sample container carrier of the number of sample container carriers, is closed or open,
    information regarding a physical property of a sample container of a sample container carrier of the number of sample container carriers,
    information regarding an anatomical origin of a sample contained in a sample container of a sample container carrier of the number of sample container carriers,
    information if a sample container of a sample container carrier of the number of sample container carriers was removed from its corresponding sample container carrier or not,
    information regarding a charging level of a battery powering a sample container carrier of the number of sample container carriers, and
    information regarding an operating time of a sample container carrier of the number of sample container carriers.

8. The method according to claim 7, wherein the data to be transmitted are transferred by means of load modulation.

9. The method according to claim 7, comprising the steps:
  checking, if a determined position of a sample container carrier of the number of sample container carriers corresponds to a predetermined processing position on the transport plane, and
  if the determined position of a sample container carrier of the number of sample container carriers corresponds to the predetermined processing position on the transport plane, initiating a data transmission between the sample container carrier located at the processing position and the control unit.

10. The method according to claim 9, further comprising contactlessly supplying electrical energy by means of the touch panel to a data transmitting device of the sample container carrier located at the processing position.

* * * * *